March 8, 1960 L. G. SIMJIAN 2,927,515
VENDING MACHINE COMBINED WITH IMAGE RECORDING MEANS
Filed June 27, 1958 3 Sheets-Sheet 1

INVENTOR.
LUTHER G. SIMJIAN
BY
Erwin B. Steinberg
AGENT.

March 8, 1960     L. G. SIMJIAN     2,927,515
VENDING MACHINE COMBINED WITH IMAGE RECORDING MEANS
Filed June 27, 1958     3 Sheets-Sheet 2

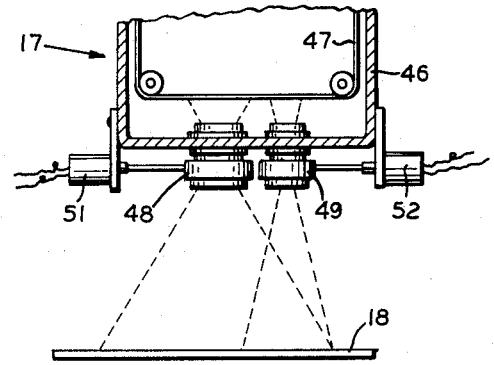

FIG. 5

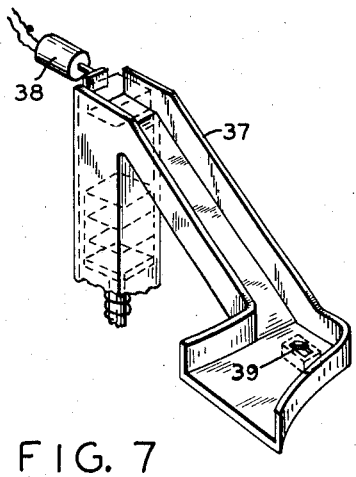

FIG. 6

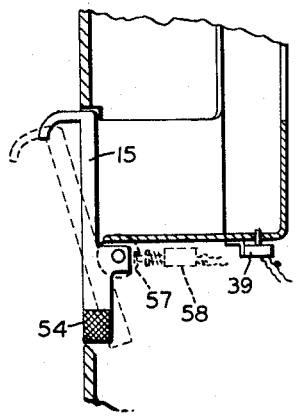

| | |
|---|---|
| START PUSH BUTTON | DEPRESSED |
| SLIDE | LOCKED |
| FILM TRANSPORT | ON |
| TIMING MOTOR | RUNNING |
| LIGHTS | ON |
| SHUTTER #1 | OPEN |
| SLIDE SOLEN. | ENERGIZED |
| ARTICLE EJECTOR | ENERGIZED |
| ARTICLE IN CHUTE | |
| LIGHT | ON |
| CHUTE SW. | CLOSED |
| SHUTTER #2 | OPEN |
| CHUTE DOOR REL. SOLENOID | ENERGIZED |

INVENTOR.
LUTHER G. SIMJIAN
BY
Ervin B. Steinberg
AGENT.

March 8, 1960 L. G. SIMJIAN 2,927,515
VENDING MACHINE COMBINED WITH IMAGE RECORDING MEANS
Filed June 27, 1958 3 Sheets-Sheet 3
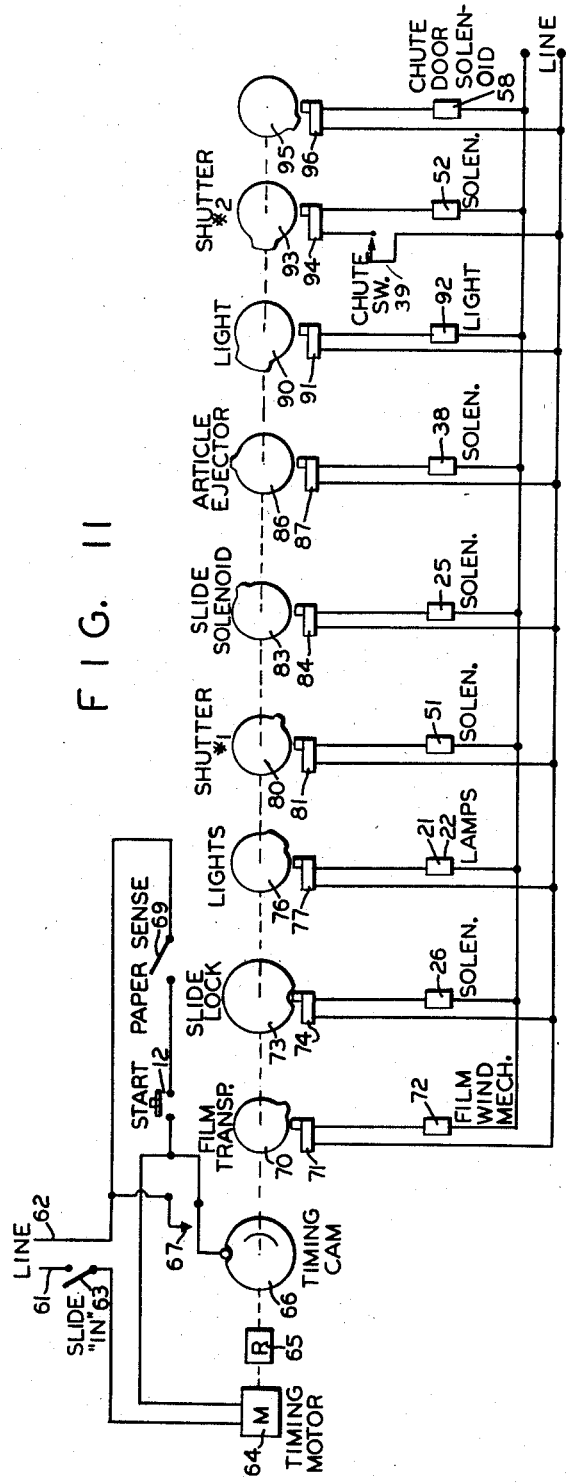
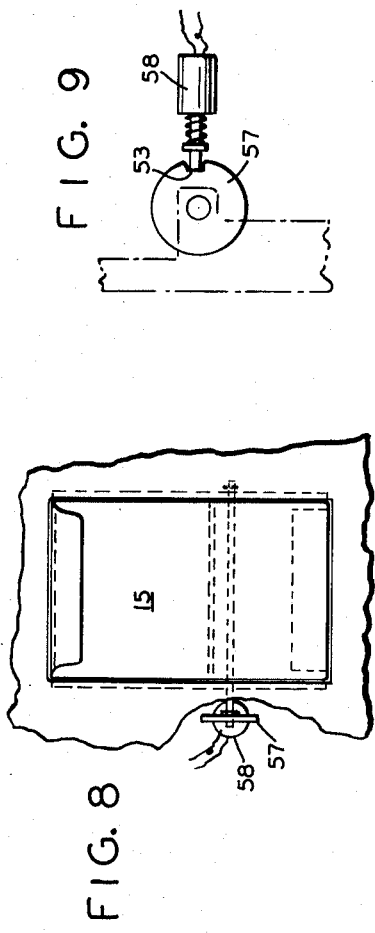
INVENTOR.
LUTHER J. SIMJIAN
BY Ervin B. Steinberg
AGENT.

United States Patent Office 2,927,515
Patented Mar. 8, 1960

2,927,515

VENDING MACHINE COMBINED WITH IMAGE RECORDING MEANS

Luther G. Simjian, Greenwich, Conn.

Application June 27, 1958, Serial No. 745,020

15 Claims. (Cl. 95—1.1)

This invention relates generally to automatic vending means and more particularly has reference to an automatic vending machine combined with image recording means. Specifically, the invention concerns a vending machine wherein an image of an article dispensed from the machine is recorded so that proof of the machine's operation is available and the identity of the article dispensed is maintained. Moreover, the instant machine incorporates such other and further features as to make it possible to associate the article vended with an object inserted into the machine and/or with a record of the depositor.

The ever increasing use and application of automatic vending machines, and the desirability to dispense goods whose price exceeds the usual 5, 10, and 25 cent variety, have made it desirable to design a machine which is adapted to accept objects having a value of one dollar or more and as a result thereof, dispense articles whose price is commensurate in value to the amount deposited. It is apparent that a machine of this type entails unique problems since the greater the value of the object which is accepted, the greater, in turn, the value of the article which must be rendered to the person patronizing the machine. This risks assumed by the depositor as well as by the proprietor of the vending machine are therefore, becoming a matter of grave concern.

In my copending application for U.S. Letters Patent, Serial No. 691,000, filed October 18, 1957, I have disclosed a vending machine which records an image of the depositor using the machine as well as an image of the object deposited, both images being in identifiable relationship with respect to one another. In this manner, the identity of the deposit and of the depositor is maintained in associated relationship. The instant invention contemplates as a further step, maintaining a record of the article dispensed so as to be able to bring proof that an article was available to the depositor. It will be apparent that this type of documentation increases in importance as the monetary value of the object received and of the article dispensed becomes greater.

The instant invention further provides methods and means whereby the image of the article rendered may be associated with an image of the object deposited and/or with an image of the depositor.

The image recording means employed may comprise photographic means and emulsion type film, electronic scanning and magnetic tape image storing means or other suitable means or techniques known in the art. It will be apparent that the image records, similar to microfilm records in a bank, need not necessarily be developed at all times but may be consulted only in the event of error, discrepancy, audit, deliberate or intentional fraud, etc. At all times, however, there will be available an image of the vended article, and this image may be disposed, if desired, in identifying relationship with images of the object deposited, or the depositor, or both.

It will be apparent that a machine of this type is useable in offices, factories, commercial establishments, and in many public locations. Still further, such a machine will prove to be of considerable value in dispensing money, insurance policies, merchandise, and other articles of value whose worth is in excess of the usual nickel and dime variety.

One of the objects of this invention, therefore, is the provision of an improved vending machine combined with image recording means.

Another object of this invention is to provide a vending machine which maintains a record of an article dispensed therefrom in exchange for an object deposited.

Another object of this invention is the provision of a vending machine combined with image recording means useable for accepting objects and dispensing articles of considerable value.

Another object of this invention is to provide a vending machine combined with image recording means for recording an image of the article dispensed prior to rendering the article available to the depositor using the vending machine.

Another object of this invention is the provision of a vending apparatus combined with image recording means in which an image of the object deposited and of the article dispensed is retained, both images being in identifiable relationship.

Another and further object of the invention is the provision of a vending machine which provides images to trace the progress of the vended article from its normal storage position within the machine to a new position within the machine, this latter position being accessible to a depositor patronizing the machine.

Another and will further object of this invention is to provide a machine which vends an article of considerable value, records an image of the article vended, and associates this image with an image of the depositor and of the deposit in exchange for which the article is ejected from the machine.

In its simplest form the invention comprises a vending machine combined with image recording means. The machine is actuated by depositing an object within the machine. Dispensing means are operatively connected to the machine to dispense an article from a storage means within the machine to a position accessible to the depositor, and the image recording means provided record an image of the article which is rendered to the depositor.

For a better understanding of the present invention together with other and further objects thereof, reference is made to the following description taken in conjunction with the accompanying drawings in which:

Figure 5 is a close-up view, in vertical section, of certain portions of the image recording means;

Figure 6 is a perspective view of the article dispensing mechanism and the chute which guides the article from a storage position to a position which is accessible to the depositor;

Figure 7 is an elevational view, partly in section, of the mechanism which permits the depositor to gain access to the article dispensed;

Figure 8 is a front view, partly in section, of the mechanism operated by the depositor to receive the article ejected from within the machine;

Figure 9 is an enlarged view of the locking mechanism shown in Figures 7 and 8;

Figure 10 is a timing diagram showing one complete cycle of the vending machine, and Figure 11 is a schematic electrical circuit diagram which may be used to operate the machine.

As used hereinafter, depositing an "object" and receiving an "article" or "second object" in exchange therefor shall include but not be limited to: money in paper denomination, coin money, paper bills and coin money combined, checks, certificates which may be exchanged for other articles of value, and/or similar documents or instruments having a value on a negotiable or non-negotiable basis, an article of merchandise, an article of merchandise combined with money, an insurance policy, a receipt, or a similar article or document with which a value is or may be associated.

Figure 1:
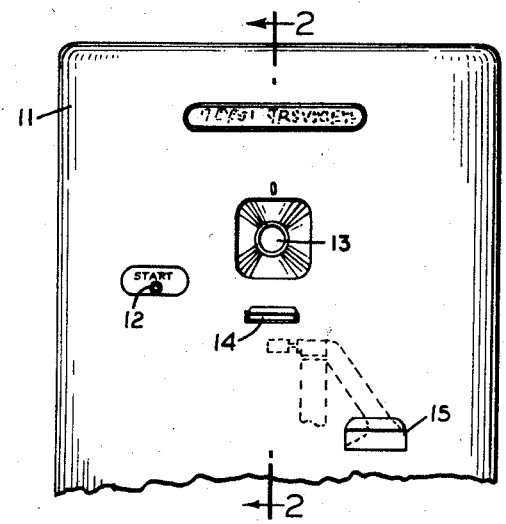
Figure 1 is a view at the front panel of the vending machine.

Referring now to the figures and Figure 1 in particular, a depositor using the instant machine faces a front panel 11, which contains a starting button 12 to start the machine, an aperture 13 through which the depositor's image may be recorded, an aperture containing a slide 14 provided to accept the depositor's objects for deposit within the machine, and a door 15 which is connected via a chute to an internal dispensing mechanism to dispense an article in exchange for the object deposited on slide 14.

Figure 2:
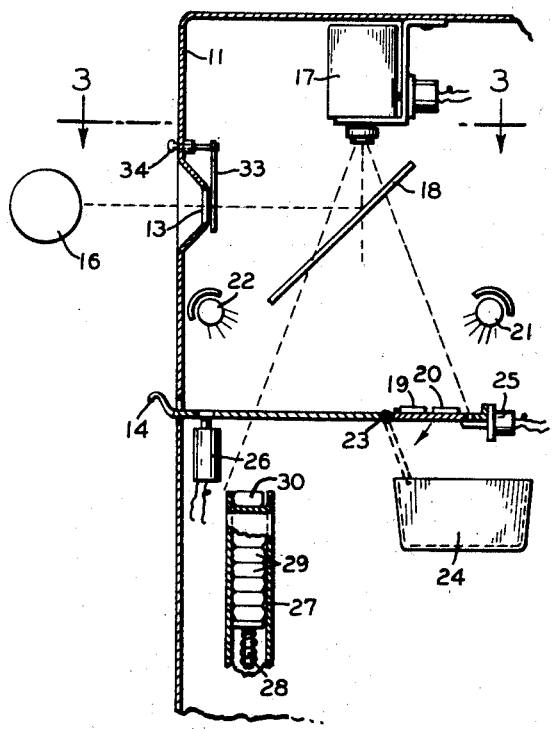
Figure 2 is an elevational view, partly in section, of the machine along lines 2—2 of Figure 1.

Figure 2 illustrates some of the internal disposition of the various elements. Image recording means, such as a camera 17, receives an image of the depositor 16 facing the front panel via inclined, partially transparent mirror 18. In line of sight of the camera 17, but underneath mirror 18, there is arranged slide 14 on which are located for instance, objects 19 and 20, to be deposited. These objects may be photographed by camera 17 with the aid of illumination means 21 and 22 disposed to provide the necessary light. In order to accomplish the deposit of objects 19 and 20 within the machine, the right or rear portion of the slide is mounted about a hinge 23 so that the rear portion of the slide may pivot and drop objects 19 and 20 into a receptacle 24. The release of the rear portion of the slide is initiated by retracting a plunger operated solenoid 25. As the slide 14, during subsequent operation of the machine, is pulled out of the machine toward the depositor, guide means (not shown) are provided to pivot the rear portion back into horizontal alignment so as to form a continuous surface. Mechanisms to accomplish this are well known to those skilled in the art and do not form a part of this invention. A somewhat modified mechanism to remove an object from a tray type slide is illustrated in my copending application for Letters Patent referenced hereinbefore. A solenoid and plunger combination 26 serves to lock the slide in its inward position so that the object deposited on the slide may not be withdrawn after the machine once has been started and image recording by camera 17 is in progress.

Numeral 27 refers to a compartment or hopper carrying at its lower end a spring loaded plunger 28 and dispensing articles 29. Numeral 30 indicates, for the purpose of further description, the uppermost article in the hopper.

It will be noted that the uppermost article 30, objects 19 and 20 and depositor 16, are in line of sight of the camera 17 so that simultaneously an image from these three different locations becomes available. A shutter 33, operable by key means 34, is disposed behind the aperture 13 so that the image of the depositor using the machine, if desired, may be excluded from the image recording means.

Figure 3:
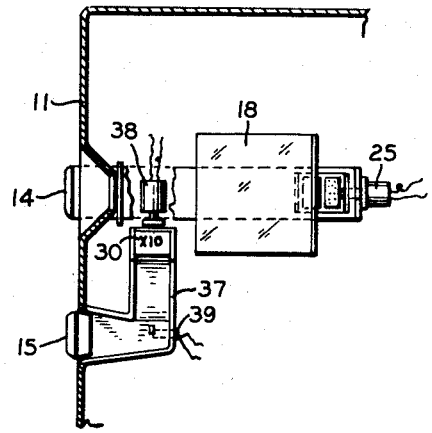
Figure 3 is a plan view of the vending machine along lines 3—3 of Figure 2.

Figure 3 is a plan view of certain portions of the apparatus and shows the slide 14 in relation to the transparent mirror means 18. Hopper 27 is connected via a chute 37 to an access door 15 on the front panel, the door being used by the depositor to obtain access to the article ejected from the hopper. Article 30 is displaced from its position in the hopper by a solenoid and plunger combination 38, the article sliding by gravity along the chute toward door 15. Switch 39 within the chute is actuated when article 30 traverses the chute, the switch causing operation of the image recording means for the purpose of providing proof that the article was in the chute and in a position accessible to the depositor.

Figure 4:
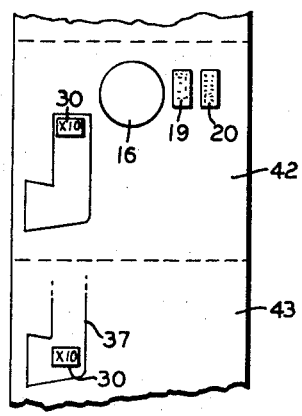
Figure 4 is a plan view of the record available after the machine has operated.

Figure 4 shows a typical image record obtained from the camera means. The record is divided into two frames by virtue of the arrangement described in more detail in connection with Figure 5. It will be apparent however, to those skilled in the art, that a single frame picture would provide similar results. The upper frame 42 deposits an image of the depositor 16, provided of course, that shutter 33 is open, an image of articles 19 and 20 deposited on the slide, and an image of article 30 disposed at the uppermost position in the hopper. The lower frame 43 shows an image of article 30 in proximity to switch 39 proving that the article has been ejected from its position in the hopper, has traversed the chute and is near access door 15. Moreover it will be found that all these images are in associated relationship with one another, that the image of the article dispensed may be readily associated with the image of the depositor and the image of the objects deposited and that the progress of the ejection of an article in exchange for the deposit may be traced by reference to the two consecutive frames. It is obvious to those skilled in the art that by means of a double exposure on the same frame and by preventing the energizing of certain illuminating means, the progress of the ejection of the article 30 may be inspected on a single frame.

Figure 5 shows a typical image recording means 17 which may be employed to accomplish the foregoing result. The camera comprises schematically a housing 46 and a photographic film 47 contained therein. The film transport mechanism (not shown) is one in which a motor advances the film by a predetermined amount every time an exposure is made and a switch is actuated. Cameras of this type are well known in the art. The instant camera is fitted with a wide angle lens 48 and another lens 49, both being arranged substantially side by side to achieve the result shown in Figure 4. The wide angle lens is used to take the images from the three different locations, that is, depositor, object deposited, and article prior to being ejected, whereas lens 49 takes the image of article 30 when the article is disposed in proximity to door 15. Lens mechanism 48 is fitted with a solenoid operated shutter 51 and lens 49 with a similar shutter and solenoid combination 52, both shutters and solenoids becoming energized from a timing mechanism which will be described in Figure 11.

Figure 6 illustrates some of the details of the article storing mechanism and the chute connected to it. The uppermost article is ejected by a solenoid and plunger mechanism 38 so that the article under the influence of gravity, falls through the inclined chute 37 actuating switch 39, and finally comes to rest near door 15. It will be apparent that switch 39 may be replaced by photoelectric means or other suitable sensing means without deviating from the art.

Figures 7, 8 and 9 illustrate a typical embodiment of the door and its operating mechanism, the door constituing the position which is accessible to the depositor for receiving the article in exchange for the deposit. Door 15 is equipped with a cam 57 mounted so that the cam rotates with respect to the solenoid and plunger combination 58 as the door is rotated for opening or closing. When the door is in its innermost (closed) position, as shown in solid lines on Figure 7, the plunger associated with solenoid 58 engages a recess 53 in cam 57 to keep the door locked. The movable door mechanism is fitted with a weight 54 which is maintained slightly to the left of the axis through the center of cam 57 about which the door pivots. When solenoid 58 is energized and its associated plunger retracts, the weight is urged toward the center of gravity, the rear, thereby opening the door (dotted position in Figure 7). When the door is in this position, the depositor can open the door further by pivotal motion and gain access to the article disposed in the rear of the door. As the article is removed and the depositors hand frees the door, door 15 pivots and the weight 54 will overshoot the center of gravity position by virtue of its inertia, thus causing the plunger to re-engage recess 53 thereby restoring the locked door position.

Figure 10 shows a typical timing diagram of the instant vending machine. The depositor using the machine first will draw out the slide 14, place objects 19 and 20 thereupon, push the slide into the machine and then depress starting push button 12 on the front panel. A brief moment thereafter, the slide becomes locked in position so that the object placed on the slide can no longer be withdrawn from the machine. The film transport mechanism becomes energized to bring a new portion of film in view of lenses 48 and 49. Operating start push button 12 moreover, sets a timing motor and cams coupled thereto into motion which cause the following additional operations:

Lights 21 and 22 become energized, solenoid 51 associated with lens 48 (shutter 1) becomes actuated in order to take the image shown on frame 42, slide solenoid 25 becomes activated to accomplish deposit of objects 19 and 20 in receptacle 24. Next, article ejector 38 is energized to send article 30 along its way, a light (not shown) becomes energized which illuminates the article while in the chute position, switch 39 becomes actuated and as switch 39 is operated, solenoid 52 is energized to permit lens 49 (shutter 2) to provide an image on frame 43 and finally, the chute door release solenoid 58 is actuated to open door 15 permitting the depositor to remove the article.

It will be apparent that this timing diagram is only a typical embodiment and that various modifications in timing and cycling may be made. For instance, the chute door, solenoid 58 can be interlocked with switch 39 to permit opening of the door only when the article has actuated switch 39. Moreover, cycling may be reversed releasing for instance, an article from the storage position first and depositing the objects 19 and 20 in receptacle 24 subsequently so as to assure that there is an article in the chute accessible to the depositor prior to accepting the object for deposit. Still further, other interlocks and failsafe means may be provided as are well known in the art of automatic vending machines. The timing cycle described above is arranged however, for logical presentation and lends itself to describing the simple electrical circuit shown in Figure 11.

Timing motor 64 (Figure 11) is connected to line voltage by means of conductors 61 and 62 and via a series circuit which includes a "slide-in" sensing switch 63 which senses that the slide is in its inward position (not shown in Figures 2 and 3), start pushbutton switch 12, and a paper sensing switch 69. Switch 69 senses that an object 19 or 20 is disposed on the slide so that the machine cannot be started unless an object has been inserted. It is obvious that this switch may comprise a contact switch, a weight switch, photoelectric sensing means or other suitable sensing or comparing means. Motor 64 is coupled mechanically via a gear reducer 65 to a plurality of timing cams whose function will be described in the following:

Cam 66 is a timing cam which, as soon as the motor is operating, closes switch 67 in order to by-pass the starting pushbutton switch 12 and sensing switch 69. Film transport cam 70 will, soon after starting, actuate switch 71 which in turn actuates the film wind or film transport mechanism 72 to advance the film, bringing a new portion of film in sight of lenses 48 and 49. Immediately after starting, cam 73 actuates switch 74 which in turn causes energizing of slide locking solenoid 26 to maintain the slide locked in its inward position for the duration of the operating cycle of the vending machine. It may be noted that cam 66 and cam 73 are substantially identical in their configuration. A brief moment thereafter, lights 21 and 22 become energized via switch 77 and cam 76, and during the time that these lights are energized, solenoid 51 of lens 48 is actuated by engagement between cam 80 and switch 81 to provide the first exposure. Subsequently, solenoid 25 becomes energized via switch 84 and cam 83 to effect storing of objects 19 and 20 in receptacle 24.

Next, article ejection cam 86 actuates switch 87 to cause operation of solenoid 38, sending article 30 toward door 14. Illumination means 92 (not shown in Figures 2 and 3) becomes energized via cam 90 and switch 91 to illuminate the article in the chute. As article 30 engages switch 39, a circuit is closed via switch 94 engaged by cam 93 so as to operate solenoid 52 thereby taking an exposure of the article as disposed in a position accessible to the depositor. Finally, cam 95 engages switch 96 to energize locking solenoid 58 which causes unlocking of door 15 therby completing substantially one cycle of operation of the machine.

It will be apparent to those skilled in the art that the machine described above may be equipped with a sensing apparatus to determine and verify the genuineness of a denomination inserted into the machine prior to dispensing an article from the hopper. Verification devices employing photoelectric scanning means, alignment against a master copy, color determination, etc., are well known in the art and need not be described. Moreover, such a verification device may be employed to automatically determine the denomination of paper money, to establish whether the bill is in the denomination of one, two, five or ten dollars, thereby either rejecting a wrong denomination or dispensing from different hoppers articles which are related to the particular denomination inserted into the machine. It will be apparent that these means may readily be added and incorporated in the foregoing apparatus without departing from the scope of the invention.

It will be seen further by those skilled in the art that the object inserted into the machine and the article ejected may additionally be identified prior to acceptance or ejection respectively, by affixing thereupon a date stamp, a serial number, a stamp, date, or other markings or stampings for the purpose of identification, validation, or certification, the marking means being contained inside the machine. The apparatus may be fitted also with coin receiving and slug rejection devices without deviating from the principle disclosed.

Finally, one of the further modifications which may be incorporated comprises that the photography of the article behind the access door or in the chute may be accomplished in response to the depositor opening the access door. It will be apparent that this modification will require a slight adjustment of the operating cycle so as to temporarily stop the timing operation until the depositor has performed his function. Again, however, an image of the article is taken prior to the depositor obtaining possession of the article.

While there have been described and illustrated specific embodiments of the invention, it will be obvious that various changes and modifications may be made therein without departing from the field of the invention which should be limited only by the scope of the appended claims.

What is claimed is:

1. A vending machine for use by a depositor, comprising: receiving means on said machine adapted to receive from said depositor a first object which is being exchanged for a second object disposed within the machine and to be issued therefrom; means disposed to view and record an image of a portion of the first object and view and record also an image of a portion of the second object, and means for operating a mechanism to issue the second object for the machine in response to the receipt of said first object and operation of the recording means.

2. A vending machine for use by a depositor, comprising: receiving means on said machine adapted to receive from said depositor a first object which is being exchanged for a second object disposed within the machine and to be issued therefrom; recording means disposed to view and record an image of a portion of the first object and view and record also an image of a portion of the second object; means for operating a mechanism to issue the second object from the machine in response to the receipt of said first object and operation of the recording means, and timing means for controlling the operation of said recording means and of the means operating said mechanism for issuing the second object.

3. A vending machine which includes a storage receptacle and article issuing means for use by a depositor, comprising: receiving means on said machine adapted to receive from said depositor for deposit and storage a first object which is being exchanged for a second object disposed within the machine and to be issued therefrom by said article issuing means; means guiding said first object from the receiving means to the storage receptacle; image recording means disposed to view and record an image of the first object before it reaches the storage receptacle and view and record also a portion of the second object before the latter is issued from the machine, and means for operating a mechanism to issue the second object from the machine in response to the receipt of said first object and operation of the recording means.

4. A vending machine for use by a depositor, comprising: receiving means on said machine adapted to receive from said depositor a first object which is being exchanged for a second object disposed within the machine and to be issued therefrom; means disposed to view and record on a photographic medium an image of a portion of the first object and view and record also on the same medium an image of a portion of the second object, and means for operating a mechanism to issue the second object from the machine in response to the receipt of said first object and operation of the recording means.

5. A vending machine for use by a depositor, said machine being equipped with a storage receptacle to receive for deposit a first object and with means retaining a second object which is to be released from the machine, comprising: an aperture on said machine adapted to receive for deposit and storage the first object; means disposed to view and photographically record an image of a portion of said first object and view and photographically record also an image of a portion of said second object in identifiable relationship with the image of said first object, and means for operating a mechanism to release the second object from the machine in response to the operation of said recording means.

6. A vending machine for use by a depositor, said machine being equipped with a storage receptacle to receive for deposit a first object and with means retaining a second object which is to be released from the machine, comprising: an aperture on said machine adapted to receive for deposit and storage the first object; means disposed to view and photographically record an image of a portion of said first object and view and photographically record on the same photographic frame also an image of a portion of said second object, and means for operating a mechanism to release the second object from the machine in response to the operation of said recording means.

7. A vending machine for use by a depositor, comprising: receiving means on said machine adapted to receive from said depositor a first object which is being exchanged for a second object disposed within the machine and to be issued therefrom; means disposed to view and record an image of a portion of the first object and view and record also an image of a portion of the second object and of the depositor, and means for operating a mechanism to issue the second object from the machine in response to the receipt of said first object and operation of the recording means.

8. A vending machine for use by a depositor, comprising: receiving means on said machine adapted to receive from said depositor a first object which is being exchanged for a second object disposed within the machine and to be issued therefrom; recording means disposed to view and record an image of a portion of the first object and view and record also an image of a portion of the second object and of the depositor; means for operating a mechanism to issue the second object from the machine in response to the receipt of said first object and operation of the recording means, and timing means for controlling the operation of said recording means and of the means operating said mechanism for issuing the second object.

9. A vending machine which includes a storage receptacle and article issuing means for use by a depositor, comprising: receiving means on said machine adapted to receive from said depositor for deposit and storage a first object which is being exchanged for a second object disposed within the machine and to be issued therefrom by said article issuing means; means guiding said first object from the receiving means to the storage receptacle; image recording means disposed to record an image of the depositor and view and record also an image of the first object before it reaches the storage receptacle and view and record a portion of the second object before the latter is issued from the machine, and means for operating a mechanism to issue the second object from the machine in response to the receipt of said first object and operation of the recording means.

10. A vending machine for use by a depositor, comprising: receiving means on said machine adapted to receive from said depositor a first object which is being exchanged for a second object disposed within the machine and to be issued therefrom; means disposed to view and record on a photographic medium an image of a portion of the first object and view and record also on the same medium an image of a portion of the second object and of the depositor, and means for operating a mechanism to issue the second object from the machine in response to the receipt of said first object and operation of the recording means.

11. A vending machine for use by a depositor, said machine being equipped with a storage receptacle to receive for deposit a first object and with means retaining a second object which is to be released from the machine, comprising: an aperture on said machine adapted to receive for deposit and storage the first object; means disposed to view and photographically record an image of a portion of said first object and view and photographically record also an image of a portion of said second object and of the depositor in identifiable relationship with the image of said first object, and means for operating a mechanism to release the second object from the machine in response to the operation of said recording means.

12. A vending machine for use by a depositor, said machine being equipped with a storage receptacle to receive for deposit a first object and with means retaining a second object which is to be released from the machine, comprising: an aperture on said machine adapted to receive for deposit and storage the first object; means disposed to view and photographically record an image of a portion of said first object and view and photographically record on the same photographic frame an image also of a portion of said second object and of said depositor, and means for operating a mechanism to release the second object from the machine in response to the operation of said recording means.

13. A vending machine for use by a depositor, said machine being equipped with a storage receptacle to receive for deposit a first object and with means retaining within a compartment a second object which is to be released from the machine in exchange for the first object, comprising: an aperture on said machine adapted to receive for deposit and storage the first object; recording means disposed to view and record an image of a portion of said first object and view and record also an image of a portion of the second object; means releasing the second object from the compartment to a position accessible to the depositor in response to the receipt of said first object, and said recording means being sequentially actuated subsequent to the release of the second object to record the advance of the latter from said compartment to said position.

14. A vending machine for use by a depositor, said machine being equipped with a storage receptacle to receive for deposit a first object and with means retaining within a compartment a second object which is to be released from the machine in exchange for the first object, comprising: an aperture on said machine adapted to receive for deposit and storage the first object; recording means disposed to view and record on a photographic medium an image of a portion of said first object and view and record also an image of a portion of the second object disposed in said receptacle; means releasing the second object from the compartment to a position accessible to the depositor in response to the receipt of said first object and operation of said recording means, and said recording means being actuated subsequent to the release of the second object from said compartment to record on the same medium at least one further image of the second object as the latter advances from said compartment to said position.

15. A vending machine of the type described and as set forth in claim 14 wherein said recording means records on the photographic medium also an image of the depositor.

References Cited in the file of this patent

UNITED STATES PATENTS

| | | |
|---|---|---|
| 2,699,100 | Simjian | Jan. 11, 1955 |
| 2,796,812 | Roci | June 25, 1957 |
| 2,840,214 | Doud | June 24, 1958 |

UNITED STATES PATENT OFFICE
CERTIFICATE OF CORRECTION

Patent No. 2,927,515                    March 8, 1960

Luther G. Simjian

It is hereby certified that error appears in the printed specification of the above numbered patent requiring correction and that the said Letters Patent should read as corrected below.

Column 1, line 38, for "This" read -- The --; column 2, line 33, for "will" read -- still --; column 4, line 12, for "deposits" read -- depicts --; column 6, line 21, for "therby" read -- thereby --; column 7, line 1, for "for" read -- from --; column 10, line 21, list of references cited, for "Roci" read -- Koci --.

Signed and sealed this 23rd day of August 1960.

(SEAL)
Attest:

KARL H. AXLINE                                ROBERT C. WATSON
Attesting Officer                             Commissioner of Patents